United States Patent
Wurst et al.

(10) Patent No.: US 8,140,718 B2
(45) Date of Patent: Mar. 20, 2012

(54) STATUS NOTIFICATIONS

(75) Inventors: Alysia Wurst, Boise, ID (US); Shell Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2124 days.

(21) Appl. No.: 11/008,395

(22) Filed: Dec. 8, 2004
(Under 37 CFR 1.47)

(65) Prior Publication Data
US 2006/0123151 A1 Jun. 8, 2006

(51) Int. Cl.
*G06F 3/00* (2006.01)
*G03G 15/00* (2006.01)
(52) U.S. Cl. .................. 710/19; 710/15; 399/13
(58) Field of Classification Search .............. 399/24, 399/23, 13; 710/19, 15
See application file for complete search history.

(56) References Cited

U.S. PATENT DOCUMENTS

| | | | | |
|---|---|---|---|---|
| 5,077,582 | A * | 12/1991 | Kravette et al. | 399/8 |
| 5,727,135 | A * | 3/1998 | Webb et al. | 358/1.14 |
| 6,370,341 | B1 * | 4/2002 | Haines | 399/24 |
| 6,430,711 | B1 * | 8/2002 | Sekizawa | 714/47 |
| 6,604,212 | B2 * | 8/2003 | Sekizawa | 714/47 |
| 6,681,349 | B2 * | 1/2004 | Sekizawa | 714/47 |
| 6,700,678 | B1 | 3/2004 | Luman | |
| 6,734,985 | B1 | 5/2004 | Ochiai | |
| 6,735,641 | B1 | 5/2004 | Kobayashi et al. | |
| 7,383,474 | B2 * | 6/2008 | Sekizawa | 714/57 |
| 2002/0116480 | A1 | 8/2002 | Muto | |
| 2003/0050984 | A1 | 3/2003 | Pickup et al. | |
| 2003/0200427 | A1 | 10/2003 | Kemp et al. | |
| 2003/0229691 | A1 | 12/2003 | Ishimoto | |
| 2004/0036908 | A1 | 2/2004 | Yagita et al. | |
| 2004/0105122 | A1 | 6/2004 | Schaeffer | |
| 2004/0111482 | A1 | 6/2004 | Bourges-Waldegg | |

\* cited by examiner

*Primary Examiner* — Chun-Kuan Lee
*Assistant Examiner* — Ernest Unelus

(57) ABSTRACT

A status notification method includes providing a forwarding manager for a status notification. The forwarding manager enables the status notification to be directed to a second target. Following a presentation of the status notification with respect to a first target, the status notification is directed to a second target as at least an indirect result of a utilization of the forwarding manager.

39 Claims, 10 Drawing Sheets

STATUS NOTIFICATIONS

Printers and other imaging devices consume items such as paper toner or ink, and binders such as staples, tape, or even glue. These items are often referred to as consumables. When a consumable such as paper, toner or ink is depleted, an imaging device is no longer able to function until that consumable is replaced.

Imaging devices have been adapted to send status notifications to be displayed on a computer when consumable are running low. This allows a user time to replenish those consumables and experience minimal downtime. In a network environment, an imaging device's status notification features can, by default, be turned off. This is true for a number of reasons. First, in some network environments, the end-users are not responsible for ordering consumables. If the end-user is responsible for ordering consumables, it is not clear which end-users in a given network should receive the status notification.

DETAILED DESCRIPTION OF THE INVENTION

INTRODUCTION: Various embodiments described below operate to help direct a status notification for a managed device to a desired target. The term status notification means any electronic information that can be interpreted to reveal a status of a managed device. Interpretation of a status notification may be performed by computing device, a user of a computing device, or a combination thereof. The term managed device includes any electronic device having a state that can be monitored. For example, a printer or other image forming device uses consumables such as ink or toner. A level of ink or toner is a state of the image forming device that can be monitored.

The term target as it relates to a status notification may be an individual, a computing device, or a combination thereof. For example, where a target is an individual, the status notification may be directed to an e-mail address allowing the individual to retrieve and view the status notification from one of any number of computing devices having access to e-mail. Where the target is a computing device, a status notification may be directed to an IP (Internet Protocol) address or MAC (Media Access Control) address for that computing device. The act of directing a status notification may be initiated by the target in which case the status notification is sent as a direct result of an active request made by the target. Alternatively, the act of directing a status notification may be part of an automated process that does not directly rely on the target's actions in which case the status notification is not sent as a direct result of an active request from the target. Where a target is an individual, a status notification is presented though a user interface. Where a target is a computing device, a status notification is presented through a programmatic interface.

The following description is broken into sections. The first section labeled "Environments" describes various exemplary network environments in which embodiments of the present invention may be implemented. The second section labeled "Components" describes exemplary physical and/or logical components of various embodiments of the present invention. The third section labeled "Utilizing the Forwarding manager" describes exemplary user interfaces for use in helping to direct status notifications for a managed device to a desired target. The last section labeled "Operation" describes exemplary flow charts that illustrate steps taken to implement various embodiments of the present invention.

Figure 1:
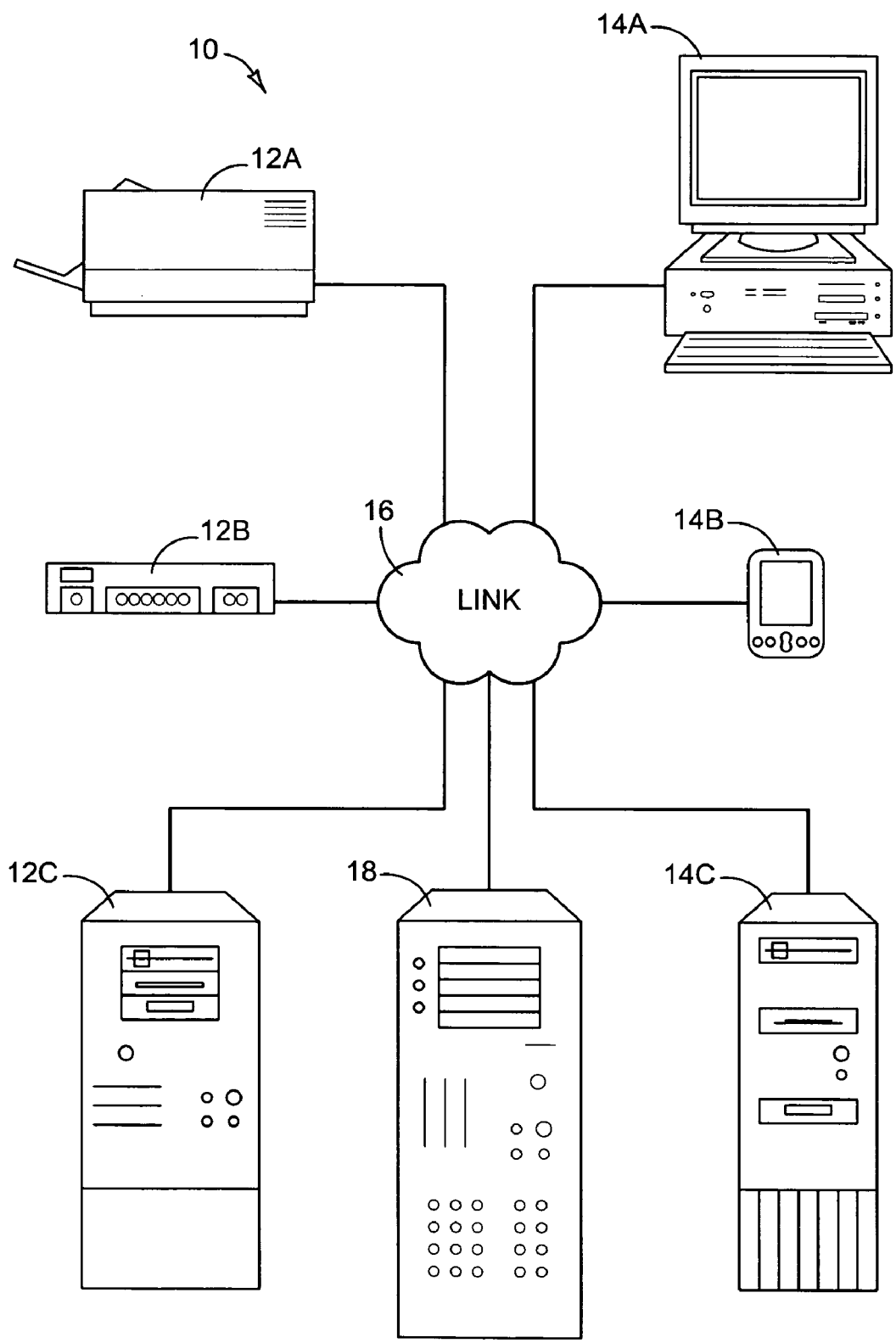
FIG. 1 is a schematic diagram of an exemplary environment in which various embodiments of the present invention may be implemented.

ENVIRONMENTS: FIGS. 1-4 illustrate exemplary environments in which embodiments of the present invention may be implemented. FIG. 1 is a schematic diagram of network 10 that includes managed devices 12A-12C, client devices 14A-14C interconnected by link 16.

Managed devices 12A-12C (referred to collectively as managed devices 12) are shown as an image forming device (12A), a network router (12B), and a file server (12C). Environment 10, however, can include any number of managed devices 12 of any type. Client devices 12A-12C (referred to collectively as client devices 12) are shown as a desktop computer (14A), a personal digital assistant (14B), and a server (14C). However, environment 10 may include any number of client devices 12 of any type. More particularly, client devices 12 represent generally any computing device capable of receiving and presenting a status notification concerning one or more of managed devices 12. As noted above, a status notification directed to an individual is presented by a client device as a user interface. A status notification directed to a computing device is presented to a program running on a client device as a programmatic interface.

Link 16 represents generally one or more cable, wireless, or remote connections via one or more of a telecommunication link, an infrared link, a radio frequency link, and/or any other connector or system that provides electronic communication between managed devices 12 and client devices 14. Link 16 may represent in whole or in part an intranet, the Internet, or a combination of both.

In the example of FIG. 1, network 10 is shown to also include managing device 18 interconnected with one or more of managed devices 12 via link 16. Managing device 18 represents generally any computing device capable of running one or more programs for monitoring the status of one or more of managed devices 12. Monitoring the status includes identifying a particular state of a managed device, for example, identifying a level of a consumable or an image forming device 12A or identifying operational statistics for file server 12C.

Figure 2:
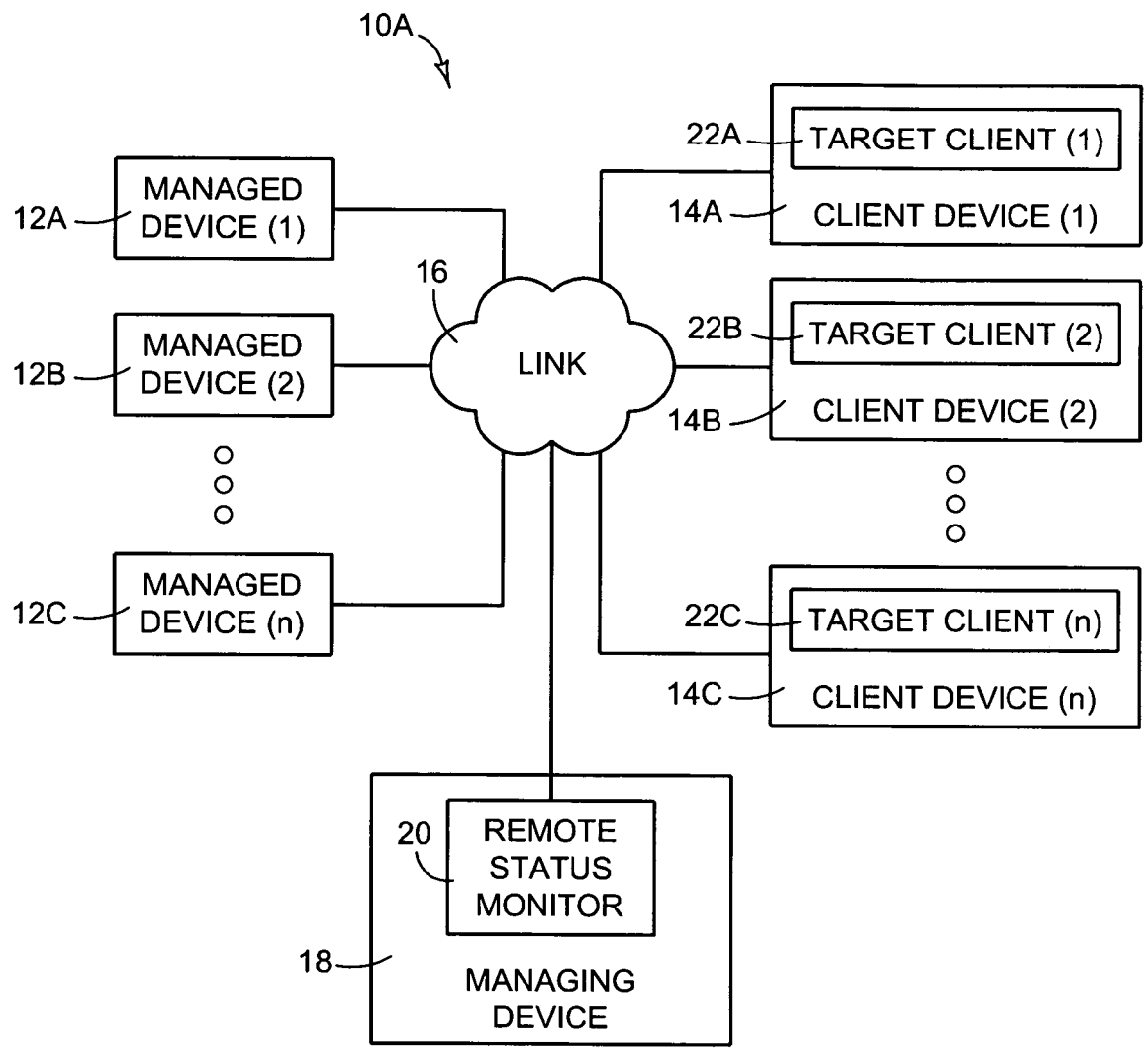
FIGS. 2-4 are block diagrams of exemplary environments in which various embodiments of the present invention may be implemented.

FIG. 2 is a block diagram of an exemplary environment 10A in which various embodiments of the present invention may be implemented. In the example shown, managing device 18 is shown to include remote status monitor 20. Remote status monitor 20 represents generally any combination of hardware and/or programming capable of communicating over link 16 to identify the status of one or more of managed devices 12. Remote status monitor 20 is also responsible for sending, via link 16, status notifications selected targets to be presented utilizing one or more of client devices 14. The act of sending can be active or passive. For example, remote status monitor 20 may actively send a status notification upon request from one or more of client devices 14 or at its own behest. Remote status monitor 20 may send a status notification after one of client devices 14 polls status monitor 20 requesting the status notification in which case sending may simply involve passively allowing the status notification to be retrieved.

Client devices 12 are each shown to include a target client 22A-22C, respectively (referred to collectively as target clients 22). Each target clients 22 represents generally any combination of hardware and/or programming capable of receiving and presenting a status notification. Target clients 22 may also be responsible for polling remote status monitor 20 to request a status notification. For example, where a target is an individual, target client 12A, for example, may be an e-mail client configured to receive and display a status notification in the form of an e-mail message addressed to that individual. Alternatively, target client 12A may be a program configured to poll remote status monitor 20 and request the status notification, and once received, present the status notification in a popup dialogue box or other user interface.

Where a target is a computing device, target client 12A may be a program capable of receiving a status notification using a programmatic interface allowing the computing device to interpret and, if appropriate, act on the information. Again, target client 12A may actively poll remote status monitor 20 and request the status notification or the status notification may be sent without a direct request from target client 12A. In either case, for example, a status notification may indicate a low toner level for a laser printer. A target client such as target client 22C operating on client device 14C may then be responsible for presenting the status notification, interpreting its contents, and placing an order for a replacement toner cartridge in an automated fashion.

Figure 3:
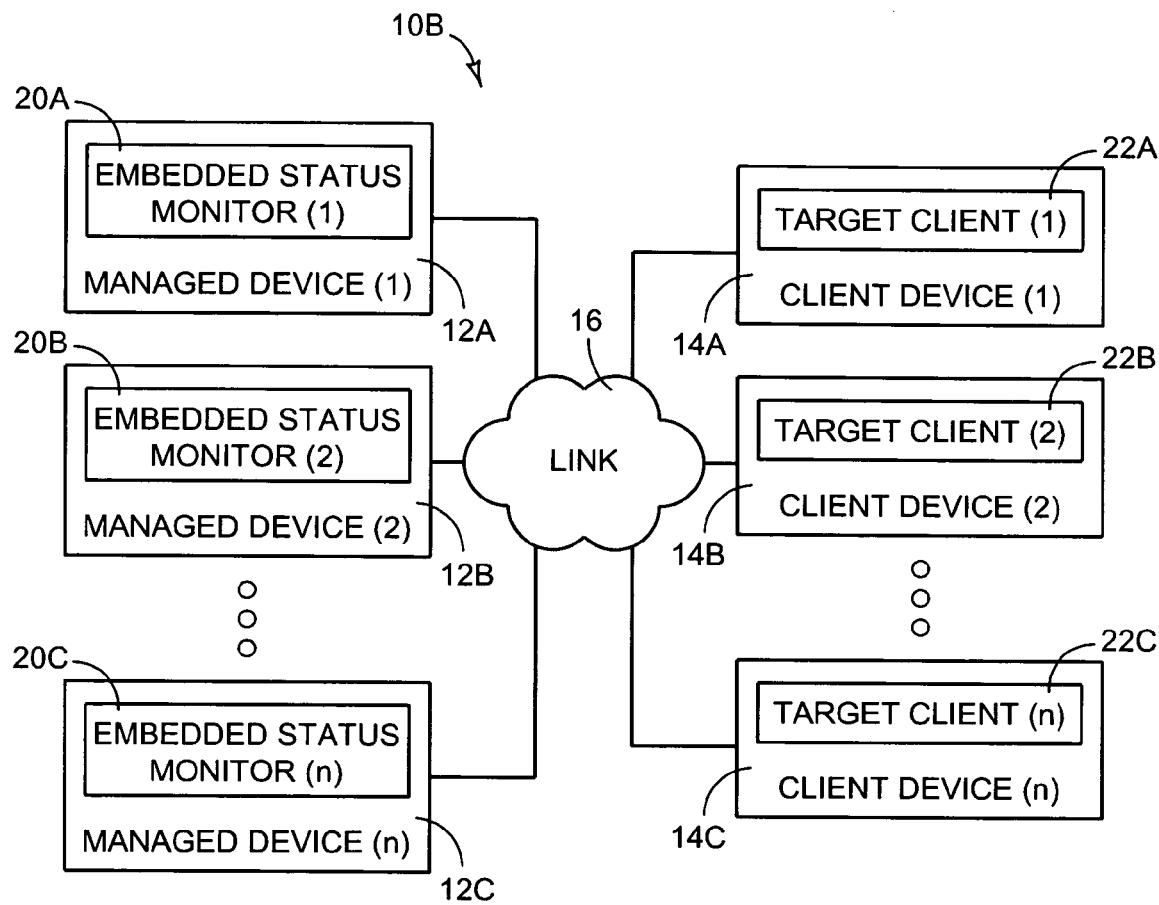

FIG. 3 is a block diagram of an exemplary environment 10B in which various embodiments of the present invention may be implemented. In the example shown, managing device 18 (FIGS. 1 and 2) is not present. Instead, each of managed devices 12 includes its own embedded status monitor 20A-20C. Each embedded status monitor 20A-20C represents generally any combination of hardware and/or programming capable of identifying the status of its corresponding managed device 12A-12C. Each embedded status monitor 20A-20C is also responsible for sending, via link 16, status notifications to selected targets to be presented utilizing one or more of client devices 14. Embedded status monitors 20 may send status notifications upon requests from one or more of client devices 14 or at their own behest. For example, remote status monitor may send a status notification after one of client devices 14 polls status monitor 20 requesting the status notification. Alternatively, remote status monitor 20 may, upon detecting some triggering event, automatically send the status notification.

Figure 4:
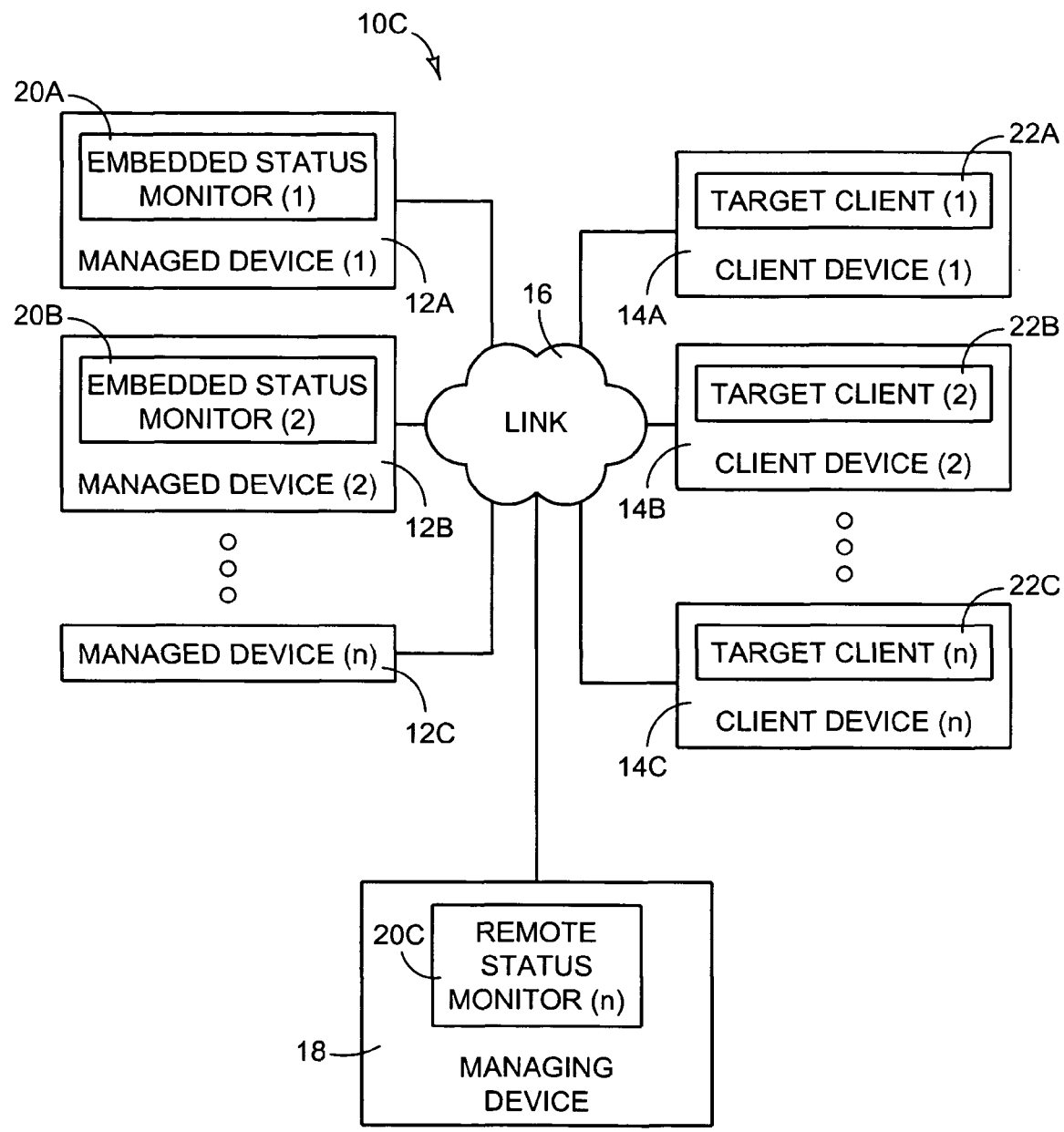

FIG. 4 is a block diagram of an exemplary environment 10C in which various embodiments of the present invention may be implemented. In the example shown, a combination of embedded and remote status monitors 20A-20C. It is noted that the term remote as used to modify the term status monitor merely reflects that the given status monitor (status monitor 20 of FIG. 2 and status monitor 20C of FIG. 4) operates independently of managed devices 12. The term embedded, as used to modify the term status monitor, merely reflects that the given status monitor (status monitors 20A-20C of FIG. 3 and status monitor 20A and 20B of FIG. 4) is an integral component of a particular managed device 12.

Figure 5:
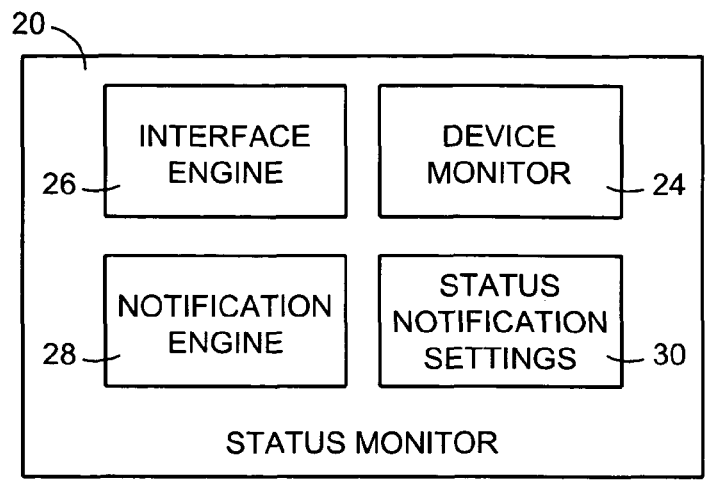
FIG. 5. is a block diagram of an exemplary status monitor according to an embodiment of the present invention.

COMPONENTS: FIG. 5 is an exemplary block diagram illustrating the logical components of status monitor 20. Status monitor 20 may be a remote status monitor as shown in FIGS. 2 and 4 or an embedded status monitor as shown in FIGS. 3 and 4. In the example of FIG. 5, status monitor 20 includes device monitor 24, interface engine 26, and notification engine 28 each of which represents any combination of hardware and/or programming capable of performing the respective tasks specified below.

Device monitor 24 is responsible for identifying a status of a managed device. Interface engine 26 is responsible for generating a status notification reflecting a status identified by device monitor 24. Notification engine 28 is responsible for directing status notifications to one or more selected targets and for providing a forwarding manager to be utilized by a target of a status notification. The forwarding manager, an example of which is described below, enables a target of a status notification to instruct that the status notification and/or future status notifications be directed to another target. Status notification settings 30 represent data for guiding the operation of notification engine 28. For example, status notification settings 30 may identify one or more targets to which status notifications are to be sent or not to be sent.

Device monitor 24, interface engine 26, and notification engine 28 may perform their respective tasks periodically or upon a triggering event. For example, device monitor 24 may periodically identify operational statistics of a file server. Interface engine 26 then periodically generates and notification engine periodically sends status notifications for the operational statistics. Device monitor 24 may perform its tasks upon the occurrence of a triggering event. Upon the triggering event, interface generator 26 generates a corresponding status notification, and notification engine 26 sends the status notification to a selected target or targets. A triggering event may include, for example, a target client 22 (FIGS. 2 and 3) polling status monitor 20 requesting a status notification on behalf of the target. However, it is noted that the term triggering event can be any detectable event such as the depletion of a consumable.

Figure 6:
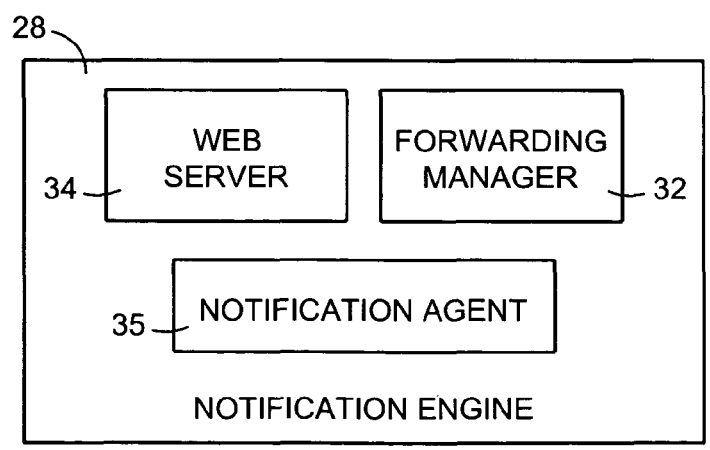
FIG. 6 is a block diagram of an exemplary notification engine according to an embodiment of the present invention.

FIG. 6 is a block diagram illustrating the logical components of notification engine 28. In the example of FIG. 6, notification engine 28 includes forwarding manager 32, web server 34, and notification agent 35 each of which represents any combination of hardware and/or programming capable of performing the tasks specified below.

Forwarding manager 32 is, as noted above, responsible for enabling a target of a status notification to instruct that the status notification and/or future status notifications be directed to another target. As is described in the following section, forwarding manager 32 may be utilized through controls provided with a status notification sent to a target. Forwarding manager 32 may be utilized through controls provided in a web page accessed using a link included in a status notification. In the latter case, web server 34 is responsible for serving the web page having controls for utilizing forwarding manager 32. Forwarding manager 32 may also be utilized to identify a new target to which the status notification or future status notifications are to be sent. Forwarding manager 32 may be utilized to prevent status notifications from being sent to a particular target.

Where a status notification is presented as a user interface, controls for utilizing the forwarding manager can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Notification agent 35 is responsible for sending a status notification to a specified target as instructed by forwarding manager 32 or as indicated by status notification settings 30. In performing its tasks, forwarding manager 32 may employ the use of status notification settings 30. Where, for example, forwarding manager 32 is utilized to identify a new target to which a future status notification is to be directed, forwarding manager 32 updates status notification settings 30 with data indicating that the future status notification is to be sent to the identified target. Where forwarding manager 32 is utilized to instruct that a current status notification is to be directed to another target, forwarding manager 32 may simply instruct notification agent 35 to send that status notification to the other target.

In the case when forwarding manager 32 is utilized to prevent future notification from being sent to a specified target, forwarding manager 32 updates status notification settings 30, accordingly. In this manner, notification agent 35 will refrain from sending status notifications to that specified target as indicated by status notification settings 30.

Notification agent 35 may also be responsible for sending forwarding notifications to a target identified utilizing forwarding manager 32. A forwarding notification is an electronic message informing a target that it has been identified to receive a status notification. A forwarding notification can be presented as a user interface or as a programmatic interface. A forwarding notification may also enable the target to which it is sent to instruct that status notifications not be sent to that target. In other words, a forwarding notification may enable a target to refuse or otherwise decline future status notifications.

As mentioned above, one or more of target clients 22 (FIGS. 2 and 3) may be responsible for polling status monitor 20 to request a status notification. Upon receipt, the status notification is presented as a pop-up or other user interface. In this case, forwarding manager 32, while shown in FIG. 6 as being a part of notification engine 28, may also or instead be part of one or more of target clients 22 (FIGS. 2 and 3). Alternatively, forwarding manager 32 may be a separate program running on one or more of client devices 14 (FIGS. 2 and 3).

Forwarding manager 32 is, as noted above, responsible for enabling a target of a status notification to instruct that the status notification and/or future status notifications be directed to another target. Where a target client 22 polls status monitor 20 requesting a status notification, forwarding manager 32, present on client device 14, may be utilized through controls provided in a pop-up or other user interface presenting the status notification. As above, forwarding manager 32 can be utilized to identify a new target to which the status notification or future status notifications are to be sent. Forwarding manager 32 can be utilized to prevent status notifications from being sent to a particular target.

Where a new target or targets are identified, forwarding manager 32 may cause status notification to be sent directly from its client device 14 to the identified target(s) via e-mail or other suitable means. Forwarding manager 32 can disable target client 22 from polling status monitor 20 requesting status notifications. Forwarding manager 32 can also update status notification settings 30 causing notification agent 35 to send future status notifications to the identified target(s) vie electronic mail or other suitable means.

UTILIZING THE FORWARDING MANANGER: FIGS. 7-12 are exemplary user interfaces through which forwarding manager 32 (FIG. 6) can be utilized. The user interfaces may, for example, present web pages, electronic mail or a combination thereof. The user interfaces may also be pop-ups generated by target clients 22.

Figure 7:
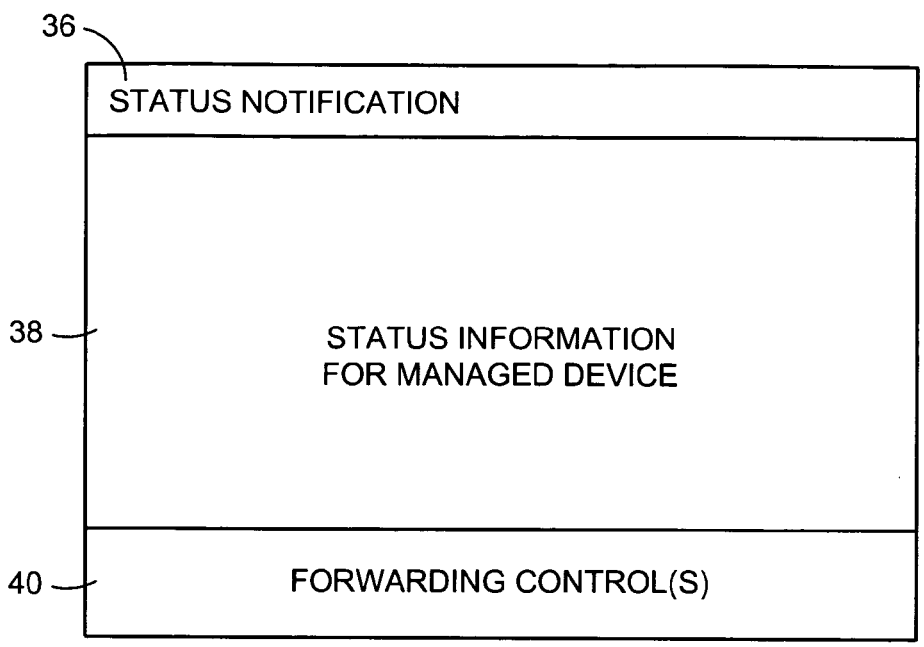
FIGS. 7-9 illustrate an exemplary user interfaces for presenting a status notification according to embodiments of the present invention.

FIG. 7 illustrates an exemplary but generic user interface 36 for presenting a status notification. User interface 36 includes two sections 38 and 40. Section 38 is used to present status information for a managed device. Section 40 contains forwarding controls. Forwarding controls are controls for utilizing forwarding manager 32.

Figure 8:
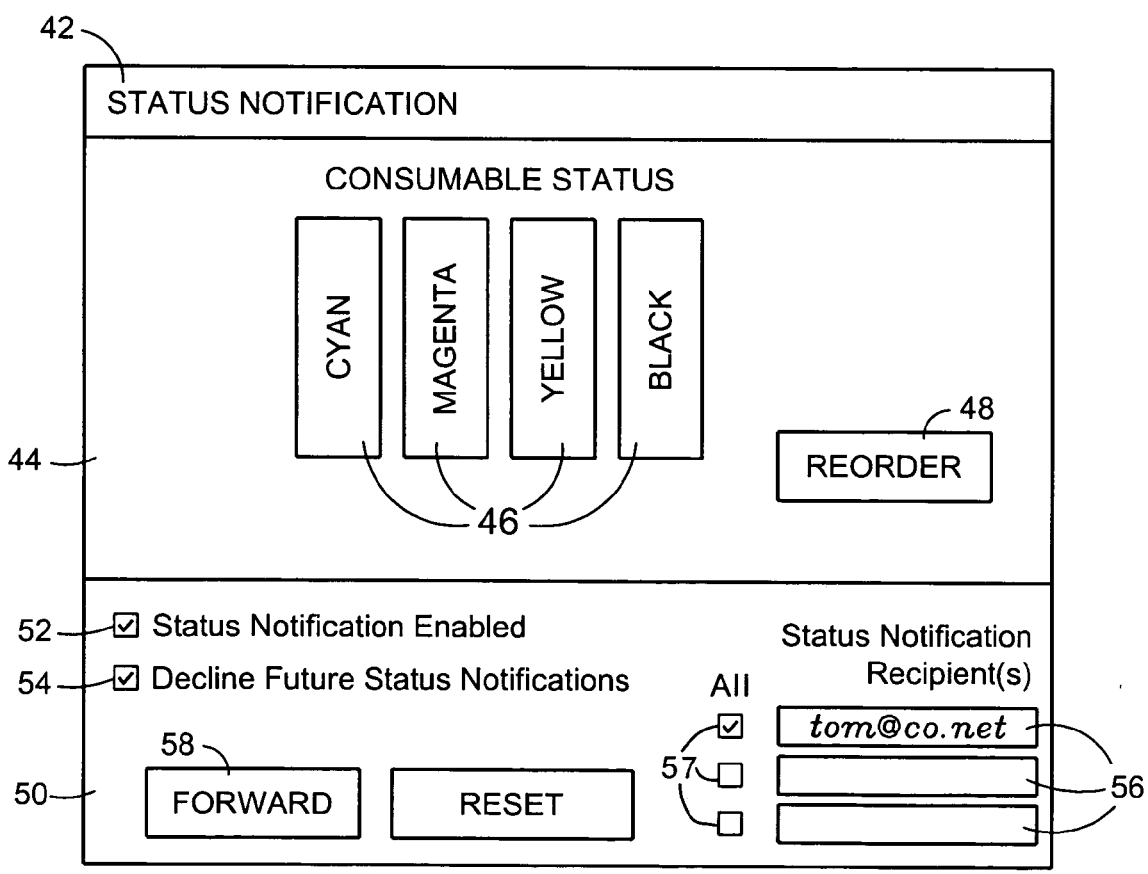

FIG. 8 illustrates an exemplary user interface 42 for presenting a consumable status notification for informing a target of state of a consumable used by a managed device. User interface 42 includes section 44 containing information regarding the consumable. In this example, that information includes level indicators 46. However, section 44 may just as easily display the status of any other type of consumable. Section 44 is also shown to include reorder button 48 serving as a link to a web site for reordering the consumable in question.

User interface 42 also includes section 50 containing controls 52-58 for utilizing forwarding manager 32. Controls 52 and 54 are check boxes for enabling or disabling status notifications and for declining or allowing future status notifications. Controls 56 include text boxes for identifying targets to which the status notification and/or future status notifications are to be directed. Controls 57 are check boxes for indicating that all future status notifications are to be sent to an identified target. Control 58 is a command button that when selected causes selections entered using controls 52-56 to be provided, sent or otherwise posted to forwarding manager 32. For example, user interface 42 may be presented as an e-mail message containing web content served by web server 34 (FIG. 6). The selection of control 58 posts selections made using controls 52-56 to forwarding manager 32. Some of the selections may be stored locally in target client 22. For example, the setting representing the selection of Decline Future Status Notifications control 54 may be stored in target client 22 and cause target client 22 to not display status notifications in the future. In such a case, target client 22 may refrain from polling for status notifications or otherwise ignore status notification sent to it.

Figure 9:
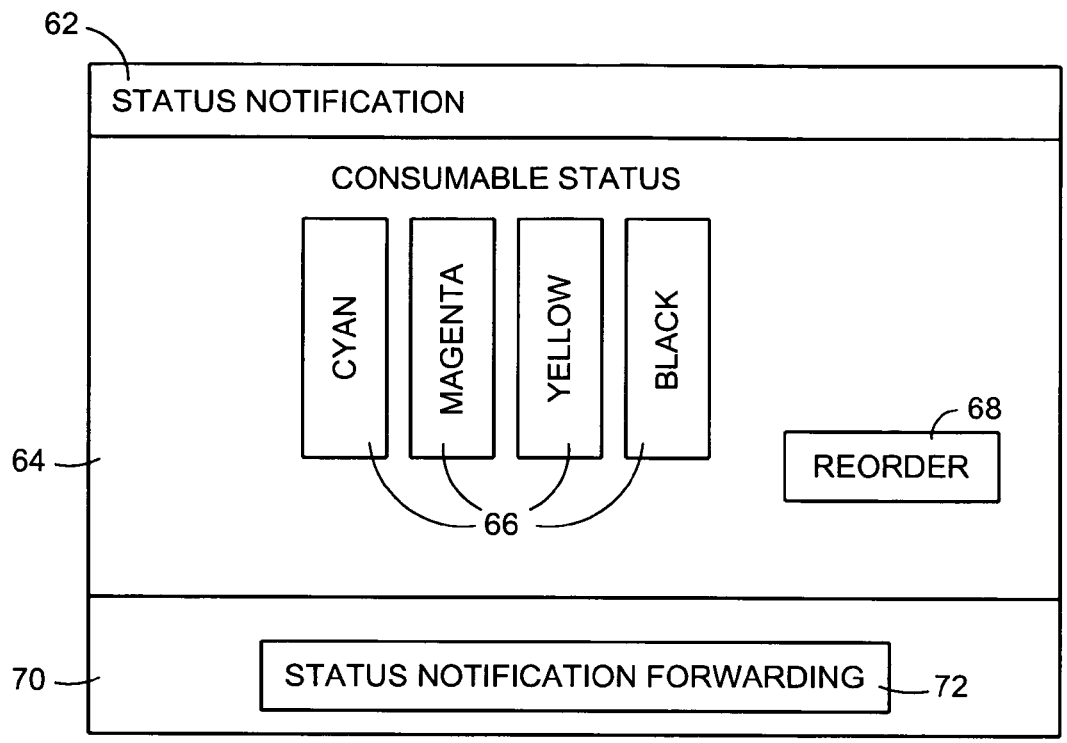

FIG. 9 illustrates an exemplary user interface 62 for presenting a consumable status notification for informing a target of a state of a consumable used by a managed device. User interface 62 includes section 64 containing information regarding the consumable. In this example, that information includes level indicators 66. However, section 64 may just as easily display the status of any other type of consumable. Section 64 may also include reorder button 68 serving as a link to a web site to reordering consumable in question. User interface 62 is also shown to include section 70 containing control 72 serving as a link for accessing a separate user interface (an example of which is shown in FIG. 10) for utilizing forwarding manager 32 (FIG. 6).

Figure 10:
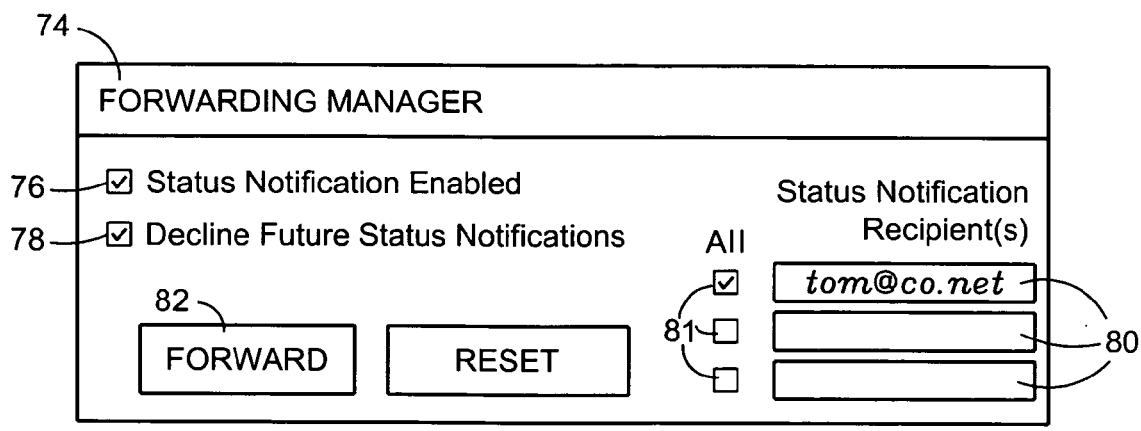
FIG. 10 illustrates an exemplary user interface for presenting controls for utilizing a forwarding manager according to an embodiment of the present invention.

FIG. 10 illustrates an exemplary user interface 74 displayed as a result of selecting control 72 shown in user interface 62 in FIG. 9. User interface 74 presents controls 76-82 for utilizing forwarding manager 32. Controls 76 and 78 are check boxes for enabling or disabling status notifications and for declining or allowing future status notifications. Controls 80 include text boxes for identifying targets to which the status notification and/or future status notifications are to be directed. Controls 81 are check boxes for indicating that all future status notifications are to be sent to an identified target. Control 82 is a command button that when selected causes selections entered using controls 76-80 to be provided, sent, or otherwise posted to forwarding manager 32. For example, user interface 74 may be presented as an e-mail message containing web content served by web server 34 (FIG. 6). The selection of control 82 posts selections made using controls 76-80 to forwarding manager 32. Some of the selections may be stored locally in target client 22. For example, the Decline Future Status Notifications 54 setting may be stored in target client 22 and cause target client 22 to not display status notifications in the future. In such a case, target client 22 may refrain from polling for status notifications or otherwise ignore status notification sent to it.

Figure 11:
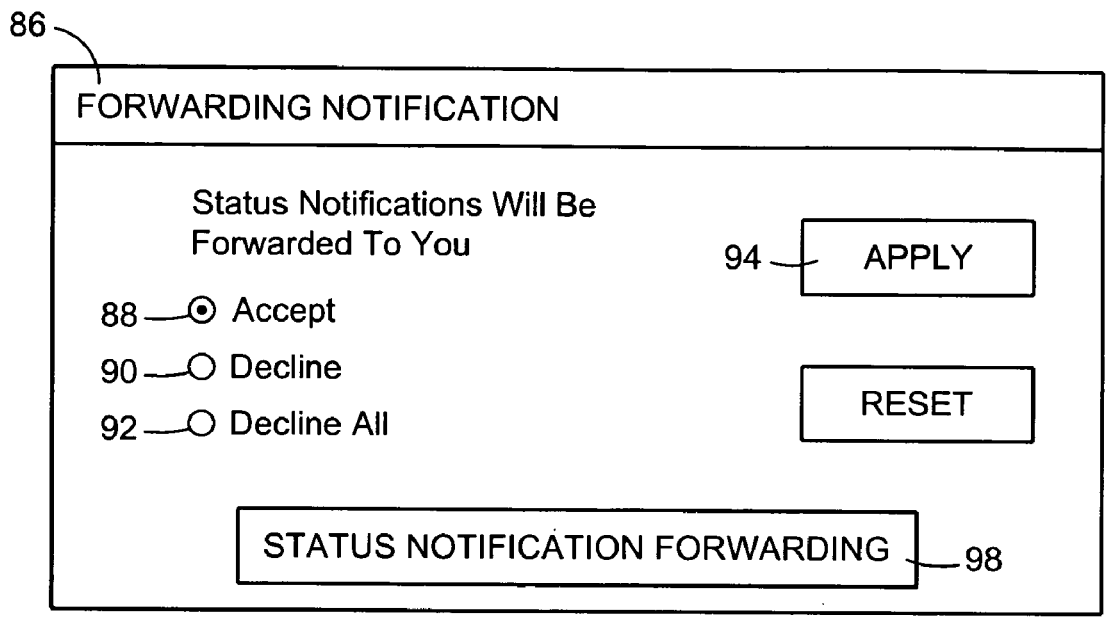
FIG. 11 illustrates an exemplary user interface for presenting a forwarding notification according to an embodiment of the present invention.

FIG. 11 illustrates an exemplary user interface 86 presenting a forwarding notification. User interface 86 informs a target that a status notification will be forwarded or otherwise sent to that target and includes controls 88-98. Controls 88-92 are radio buttons allowing the target to accept, to decline, or to decline all. Selection of control 88 indicates that the target approves of receiving the status notification. Selection of control 90 indicates that the target desires not to receive the status notification. Selection of control 92 indicates that the target desires never to receive any notifications.

Control 94 is a command button that when selected causes selections entered using controls 88-92 to be provided, sent or otherwise posted to forwarding manager 32. For example, user interface 86 may be presented as an e-mail message containing web content served by web server 34 (FIG. 6). The selection of control 94 posts selections made using controls 88-92 to forwarding manager 32. Forwarding manager 32 can then act by allowing the status notification to be sent, preventing the status notification from being sent, or preventing all status notifications from being sent to that target. Control 98 serves as a link for accessing a separate user interface for utilizing forwarding manager 32 such as user interface 74 shown in FIG. 10.

Figure 12:
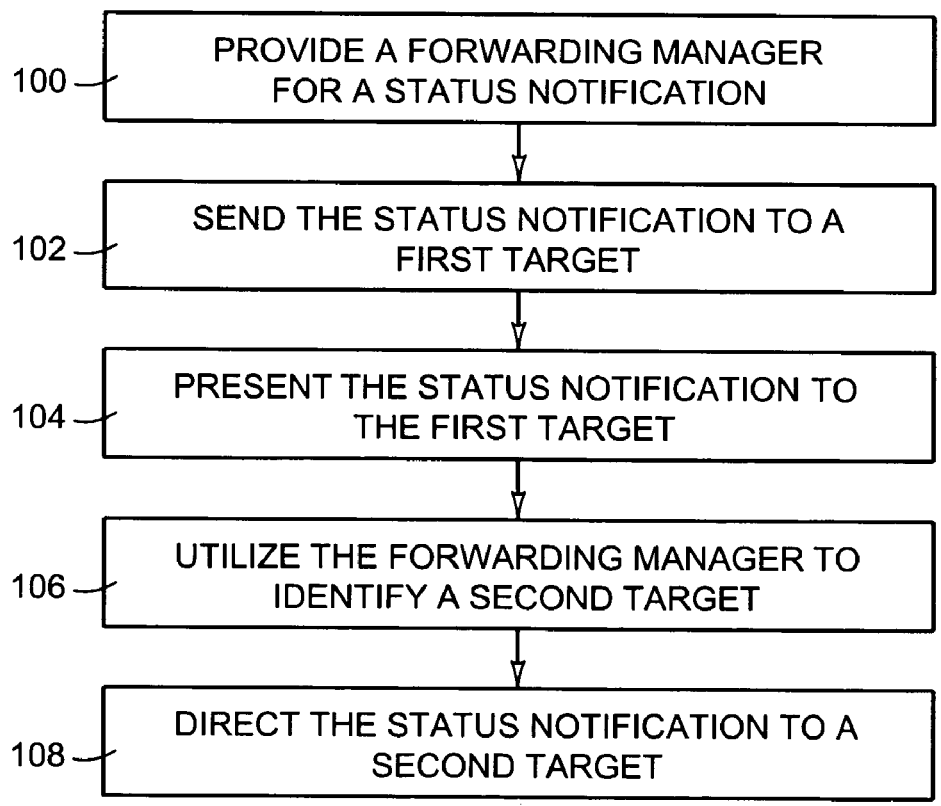
FIGS. 12 and 13 are exemplary flow diagrams illustrating steps taken to implement various embodiments of the present invention.

OPERATION: The operation of embodiments of the present invention will now be described with reference to FIGS. 12 and 13. FIG. 12 is an exemplary flow diagram illustrating steps taken to implement an embodiment. A forwarding manager is provided for a status notification (step 100). Step 100, for example can include providing, to be presented with the status notification, a link to a user interface presenting one or more controls for utilizing the forwarding manager. Step 100 can also include presenting the status notification along with one or more controls for utilizing forwarding manager.

The status notification is sent to a first target (step 102). Step 102, for example may be initiated by a target polling for or otherwise actively requesting the status notification. Alternatively step 102 may be performed without a direct request from a target. The status notification is presented to the first target (step 104). The forwarding manager is utilized to identify a second target (step 106), and the status notification is directed to the second target (step 108). Step 108, for example, can include the first target sending the status notification to the second target or instructing that it be sent to the second target.

Figure 13:
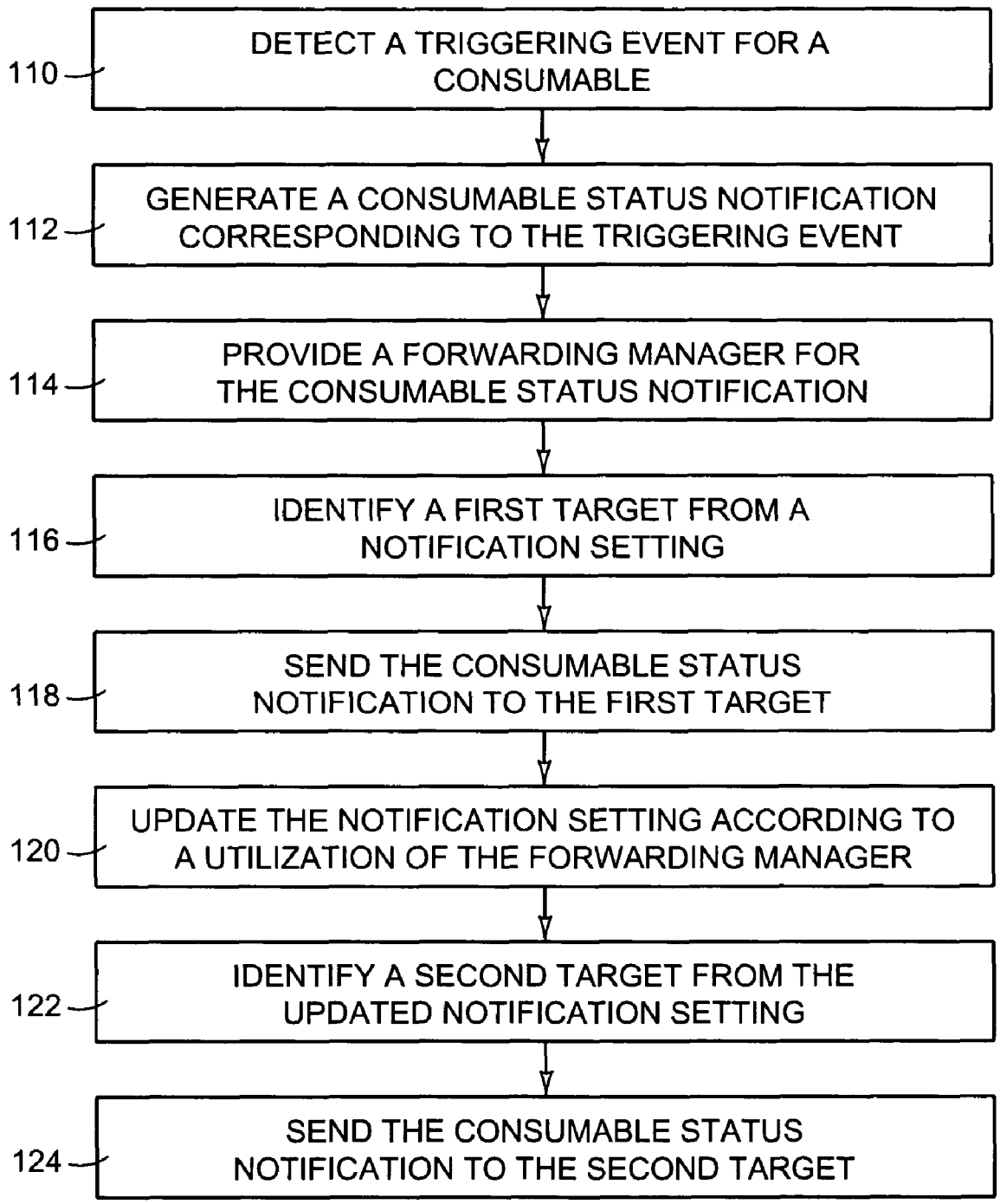

FIG. 13 is an exemplary flow diagram illustrating steps taken to implement another embodiment. A triggering event is detected for a consumable (step 110). An example includes detecting a low level of toner or ink in an image forming device. A consumable status notification corresponding to the triggering event is generated (step 112). Steps 110 and 112, for example may be initiated by a target polling for or otherwise actively requesting the status notification. A forwarding manager is provided for the consumable status notification (step 114). Step 114, for example can include providing, with the status notification, a link to a user interface presenting one or more controls for utilizing the forwarding manager. Step 114 can also include presenting, along with the status notification, one or more controls for utilizing forwarding manager.

A first target is identified from a status notification setting (step 116). The consumable status notification is sent to the first target. The status notification setting is updated, according to a utilization of the forwarding manager (step 120). A second target is identified from the updated notification setting (step 122). The consumable status notification is sent to the second target (step 124).

Figure 14:
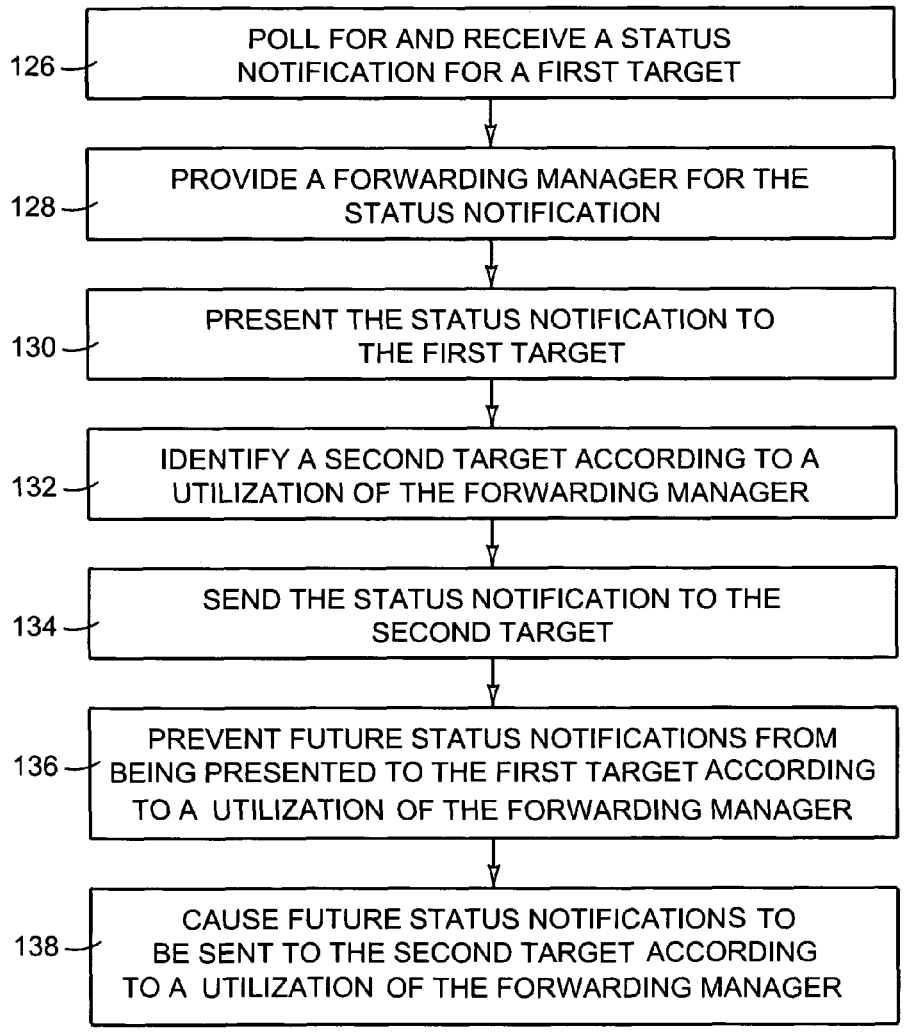
FIG. 14 is an exemplary flow diagram illustrating steps taken to implement another embodiment.

FIG. 14 is an exemplary flow diagram illustrating steps taken to implement another embodiment. Initially, a status notification is polled for and received for a first target (step 126). A forwarding manager is provided for the status notification (step 128), and the status notification is presented to the first target (step 130). Step 128, for example can include providing, with the status notification, a link to a user interface presenting one or more controls for utilizing the forwarding manager. Step 114 can also include presenting along with the status notification one or more controls for utilizing forwarding manager.

A second target is identified according to a utilization of the forwarding manager (step 132). The status notification is sent to the second target (step 134). Based on the utilization of the forwarding manager, future status notifications can be prevented from being presented to the first target (step 136) and can be caused to be sent to the second target (step 138). Referring to FIG. 8, for example, steps 136 and 138 can be initiated through the manipulation of controls 54, 56, 57, and 58 of user interface 42.

CONCLUSION: The schematic and block diagrams of FIGS. 1-4 illustrate exemplary environments in which embodiments of the present invention may be implemented. Implementation, however, is not limited to these environments. The block diagrams of FIGS. 2-6 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The exemplary user interfaces of FIGS. 7-11 are just that—exemplary. Other suitable interface configurations including programmatic interfaces may be substituted to achieve the desired results.

Although the flow diagrams of FIGS. 12 and 13 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A status notification method, comprising:
    sending a status notification to a first target, the status notification including one or more user accessible controls for communicating with a forwarding manager configured to direct the status notification to a second target; and
    following a user's selection of the one or more controls and a resulting utilization of the forwarding manager, directing the status notification to the second target as at least an indirect result of the utilization of the forwarding manager.

2. The method of claim 1, wherein the utilization of the forwarding manager sets one or more values for one or more status notification settings, the one or more status notification settings capable of at least indirectly identifying one or more targets to which the status notification is and is not to be directed.

3. The method of claim 1, further comprising generating the status notification following a detection of a triggering event.

4. The method of claim 1, wherein directing includes sending the status notification to the second target.

5. The method of claim 1, wherein directing includes instructing that the status notification be sent to the second target.

6. The method of claim 1, wherein communicating a status notification to a first target comprises communicating a status notification that includes one or more controls for communicating with a forwarding manager, wherein the forwarding manager is configured to direct the status notification configured to receive a user's identification of a second target and to cause the status notification to be directed to the identified second target.

7. The method of claim 1, wherein the one or more controls include a user selectable link for accessing a user interface having one or more controls for utilizing the forwarding manager.

8. The method of claim 1, wherein the one or more controls include one or more controls for utilizing the forwarding manager.

9. The method of claim 1, wherein the forwarding manager is configured to prevent future status notifications from being sent to an identified target, and wherein the utilization of the forwarding manager prevents a future status notification from being sent to the first target.

10. A status notification method, comprising:
    sending a current status notification to a first target, the status notification including one or more user accessible controls for communicating with a forwarding manager configured to direct a future status notification to a second target; and
    following a user's selection of the one or more controls and a resulting utilization of the forwarding manager, providing for the direction of the future status notification to the second target as at least an indirect result of the utilization of the forwarding manager.

11. The method of claim 10, further comprising directing a forwarding notification to the second target, the forwarding notification providing a notification that the future status notification is to be sent to the second target.

12. The method of claim 10, further comprising directing a forwarding notification to the second target, wherein the forwarding notification provides a notification that the future status notification is to be sent to the second target and enables the future status notification to be prevented from being sent to the second target.

13. The method of claim 10, further comprising:
    directing a forwarding notification to the second target, wherein the forwarding notification provides a notification that the future status notification is to be sent to the second target and enables the future status notification to be prevented from being sent to the second target; and
    preventing, as at least an indirect result of a utilization of the forwarding notification, the future status notification from being sent to the second target.

14. A status notification method for a consumable component of an image forming device, comprising:
    sending a consumable status notification to a first target at least indirectly identified by one or more notification settings, the consumable status notification including one or more user accessible controls for communicating with a forwarding manager configured to set one or more values for the one or more notification settings, the one or more values identifying one or more targets for the consumable status notification;
    following a user's selection of the one or more controls and a resulting utilization of the forwarding manager to set one or more values for the one or more notification settings, directing the status notification to a second target as at least an indirect result of the utilization of the forwarding manager.

15. The method of claim 14, wherein one or more of, sending and directing are performed by the image forming device.

16. The method of claim 14, wherein one or more of sending and directing are performed by a status monitor configured to monitor the image forming device.

17. A status notification method for a consumable component of an image forming device, comprising:
    sending a current consumable status notification to a first target, the current consumable status notification including one or more user accessible controls for communicating with a forwarding manager configured to set one or more values for the one or more notification settings, the one or more values identifying one or more targets for a future consumable status notification; and
    following a user's selection of the one or more controls and a resulting utilization of the forwarding manager to set one or more values for the one or more notification settings, directing the future status notification to the second target as at least an indirect result of the utilization of the forwarding manager.

18. The method of claim 17, wherein one or more of sending and directing are performed by the image forming device.

19. The method of claim 17, wherein one or more of sending and directing are performed by a status monitor configured to monitor the image forming device.

20. A non-transitory computer readable medium having instructions for:
   sending a status notification to a first target, the status notification including one or more user accessible controls for communicating with a forwarding manager configured to direct the status notification to a second target; and
   following a user's selection of the one or more controls and a resulting utilization of the forwarding manager, directing the status notification to the second target as at least an indirect result of the utilization of the forwarding manager.

21. The non-transitory medium of claim 20, wherein the utilization of the forwarding manager sets one or more values for one or more status notification settings, the one or more status notification settings capable of at least indirectly identifying one or more targets to which the status notification is to be directed and is to be prevented from being directed.

22. The non-transitory medium of claim 20, having further instructions for generating the status notification following a detection of a triggering event.

23. The non-transitory medium of claim 20, wherein the instructions for directing include instructions for sending the status notification to the second target.

24. The non-transitory medium of claim 20, wherein the instructions for directing include instructions for instructing that the status notification be sent to the second target.

25. The non-transitory medium of claim 20, wherein the one or more controls include a user selectable link for accessing a user interface having one or more controls for utilizing the forwarding manager.

26. The non-transitory medium of claim 20, wherein the one or more controls include one or more controls for utilizing the forwarding manager.

27. The non-transitory medium of claim 20, wherein the utilization of the forwarding manager sets one or more values for one or more status notification settings, the one or more status notification settings capable of at least indirectly identifying one or more targets to which future status notifications will not be sent, the medium having further instructions for preventing a future status notification from being sent to the first target as at least an indirect result of the utilization of the forwarding manager.

28. A non-transitory computer readable medium having instructions for:
   sending a current status notification to a first target, the status notification including one or more user accessible controls for communicating with a forwarding manager configured to direct a future status notification to a second target; and
   following a user's selection of the one or more controls and a resulting utilization of the forwarding manager, providing for the direction of the future status notification to the second target as at least an indirect result of the utilization of the forwarding manager.

29. The non-transitory medium of claim 28, having further instructions for directing a forwarding notification to the second target, the forwarding notification providing a notification that the future status notification is to be sent to the second target.

30. The non-transitory medium of claim 28, having further instructions for directing a forwarding notification to the second target, wherein the forwarding notification provides a notification that the future status notification is to be sent to the second target and enables the future status notification to be prevented from being sent to the second target.

31. The non-transitory medium of claim 28, having further instructions for:
   directing a forwarding notification to the second target, wherein the instructions for the forwarding notification provides a notification that the future status notification is to be sent to the second target and enables the future status notification to be prevented from being sent to the second target; and
   preventing, as at least an indirect result of a utilization of the forwarding notification, the future status notification from being sent to the second target.

32. A status notification system, comprising a device monitor, an interface engine, and a notification engine, wherein:
   the device monitor is operable to monitor a status of a managed device;
   the interface engine is operable to generate a status notification according to the status of the managed device, the status notification including one or more user accessible controls for communicating with the forwarding manager; and
   the notification engine is operable to:
      provide a forwarding manager for the status notification, the forwarding manager enabling the status notification to be directed to a second target; and
      following a presentation of the status notification with respect to a first target, direct the status notification to the second target as at least an indirect result of a utilization of the forwarding manager.

33. The system of claim 32, wherein the status notification includes one or more user accessible controls for utilizing the forwarding manager, and wherein the notification engine includes:
   the forwarding manager; and
   a notification agent operable to send the status notification to the first target and to forward the status notification to the second target.

34. The system of claim 32, wherein the status notification includes a user accessible control in the form of a link for accessing the notification engine, and wherein the notification engine includes:
   the forwarding manager;
   a web server operable to serve an interface having one or more controls for utilizing the forwarding manager in response to a selection of the link; and
   a notification agent operable to send the status notification to the first target and to forward the status notification to the second target.

35. The system of claim 32, wherein the notification engine is operable to:
   provide a forwarding manager for the status notification, the forwarding manager enabling the status notification to be directed to a second target and a future status notification to be prevented from being sent to the first target;
   following a presentation of the status notification with respect to a first target, direct the status notification to the second target as at least an indirect result of a utilization of the forwarding manager; and
   prevent, as at least an indirect result of a utilization of the forwarding manager, the future status notification from being sent to the first target.

36. The system of claim 32, wherein the notification engine is operable to:
   provide a forwarding manager for the status notification, the forwarding manager enabling the status notification to be directed to a second target and a future status notification to be prevented from or allowed to be sent to the first target;

following a presentation of the status notification with respect to a first target, direct the status notification to the second target as at least an indirect result of a utilization of the forwarding manager; and prevent the future status notification from being sent to or allow the future status notification to be sent to the first target, wherein a decision to prevent or allow is made at least indirectly as a result of the utilization of the forwarding manager.

37. The system of claim 32, wherein one or more of the device monitor, the interface engine, and the notification engine are embedded in the managed device.

38. The system of claim 32, wherein one or more of the device monitor, the interface engine, and the notification engine are remote from the managed device.

39. A status notification system, comprising:

a means for sending a status notification to a first target, the status notification including one or more user accessible controls for communicating with a forwarding manager configured to direct the status notification to a second target; and a means for directing the status notification to the second target as at least an indirect result of a user's selection of the one or more controls and a resulting utilization of the forwarding manager.

* * * * *

UNITED STATES PATENT AND TRADEMARK OFFICE
CERTIFICATE OF CORRECTION

| | | |
|---|---|---|
| PATENT NO. | : 8,140,718 B2 | Page 1 of 1 |
| APPLICATION NO. | : 11/008395 | |
| DATED | : March 20, 2012 | |
| INVENTOR(S) | : Alysia Wurst et al. | |

It is certified that error appears in the above-identified patent and that said Letters Patent is hereby corrected as shown below:

In column 10, line 45, in Claim 15, delete "of," and insert -- of --, therefor.

Signed and Sealed this
Sixth Day of November, 2012

David J. Kappos
*Director of the United States Patent and Trademark Office*